(12) United States Patent
Subbloie et al.

(10) Patent No.: US 11,625,012 B2
(45) Date of Patent: *Apr. 11, 2023

(54) ELECTRICAL EQUIPMENT FAULT DIAGNOSIS AND CONTROL

(71) Applicant: Budderfly, Inc., Shelton, CT (US)

(72) Inventors: Albert Subbloie, Orange, CT (US); Christopher J. DeBenedictis, Branford, CT (US); Jacob Marchinus Boerma, Orange, CT (US); William Butler, Orange, CT (US); Jaan Leemet, Aventura, FL (US); Kenneth Scott Fassman, Redding, CT (US); Kenneth Buda, Scarsdale, NY (US)

(73) Assignee: Budderfly, Inc., Shelton, CT (US)

( * ) Notice: Subject to any disclaimer, the term of this patent is extended or adjusted under 35 U.S.C. 154(b) by 295 days.

This patent is subject to a terminal disclaimer.

(21) Appl. No.: 17/129,270

(22) Filed: Dec. 21, 2020

(65) Prior Publication Data

US 2021/0191341 A1 Jun. 24, 2021

Related U.S. Application Data

(63) Continuation of application No. 17/110,961, filed on Dec. 3, 2020, now Pat. No. 11,334,035.
(Continued)

(51) Int. Cl.
*G05B 15/02* (2006.01)
*G05B 13/02* (2006.01)
(Continued)

(52) U.S. Cl.
CPC ........... *G05B 15/02* (2013.01); *G05B 13/026* (2013.01); *H02H 1/0007* (2013.01); *H02H 7/20* (2013.01); *G05B 13/0265* (2013.01)

(58) Field of Classification Search
CPC .. G05B 15/02; G05B 13/026; G05B 13/0265; G05B 2219/2639; G05B 23/0254; H02H 1/0007; H02H 7/20
See application file for complete search history.

(56) References Cited

U.S. PATENT DOCUMENTS 8,370,283 B2  2/2013  Pitcher et al.
8,664,937 B2 *  3/2014  Fisera .................... G01D 4/004
                                                    333/24 R
(Continued)

FOREIGN PATENT DOCUMENTS

CA        2884134 A1 * 10/2015  ........... G05B 19/048

OTHER PUBLICATIONS

Green, Daisy, et al. "NILM dashboard: Actionable feedback for condition-based maintenance." IEEE Instrumentation & Measurement Magazine 23.5 (2020): 3-10. (Year: 2020).*
(Continued)

*Primary Examiner* — Michael D Masinick
(74) *Attorney, Agent, or Firm* — St. Onge Steward Johnston & Reens LLC

(57) ABSTRACT

A system for automatically learning and adapting to the energy usage of an equipment installed at a facility or many pieces of equipment at a plurality of facilities, where the system is provided with an initial baseline energy usage signature for the equipment, which is modified by measured energy usage and by at least one peripheral sensor measurement data to create a modified energy usage signature. The system uses artificial intelligence to learn and adapt the baseline energy usage signature to learn the business operation and account for external variables such as temperature variance and increased business flow or an interaction between devices. The smart system can identify when a piece of equipment falls outside of "normal" operation and
(Continued)

Typical collection points for energy usage capture via monitoring determines what automatic action is to be taken for that piece of equipment.

27 Claims, 8 Drawing Sheets

Related U.S. Application Data

(60) Provisional application No. 62/951,684, filed on Dec. 20, 2019.

(51) Int. Cl.
*H02H 1/00* (2006.01)
*H02H 7/20* (2006.01)

(56) References Cited

U.S. PATENT DOCUMENTS

| | | | |
|---|---|---|---|
| 9,569,804 | B2 | 2/2017 | Stein et al. |
| 10,690,556 | B1* | 6/2020 | Quintana .............. H02H 1/0007 |
| 10,770,898 | B2 | 9/2020 | Beheshti et al. |
| 10,816,430 | B1* | 10/2020 | Jerphagnon .......... G01M 3/2807 |
| 10,983,496 | B1* | 4/2021 | Aljohani .............. G06N 3/0454 |
| 11,334,035 | B2* | 5/2022 | Subbloie .............. H02H 1/0007 |
| 2009/0195349 | A1* | 8/2009 | Frader-Thompson ....................... G01D 4/002 340/3.1 |
| 2011/0025519 | A1* | 2/2011 | Donaldson ............ H04L 67/125 700/295 |
| 2011/0153246 | A1* | 6/2011 | Donaldson ........... G01R 21/133 702/65 |
| 2012/0166115 | A1* | 6/2012 | Apostolakis ........... G06Q 50/06 702/62 |
| 2013/0289788 | A1* | 10/2013 | Gupta ....................... H02J 3/14 700/291 |
| 2014/0207398 | A1* | 7/2014 | Lai ............................ G01D 4/00 702/61 |
| 2016/0079757 | A1* | 3/2016 | Matan .................... G01R 11/54 307/24 |
| 2016/0132032 | A1* | 5/2016 | Bruneel ............ H02J 13/00002 700/295 |
| 2016/0274556 | A1* | 9/2016 | Murphy ................. G05B 15/02 |
| 2017/0090004 | A1* | 3/2017 | Marshall .............. G01R 15/207 |
| 2018/0034657 | A1* | 2/2018 | Brown ................ H04L 12/2823 |

OTHER PUBLICATIONS

Bouhouras, Aggelos S., Apostolos N Milioudis, and Dimitris P. Labridis "Development of distinct load signatures for higher efficiency of NILM algorithms." Electric Power Systems Research 117 (2014): 163-171. (Year: 2014).

Jin, Yuanwei, et al. "A time-frequency approach for event detection in non-intrusive load monitoring." Signal Processing, Sensor Fusion, and Target Recognition XX. vol. 8050. International Society for Optics and Photonics, 2011. (Year: 2011).

Luo, Dong, et al. "Monitoring HVAC equipment electrical loads from a centralized location-methods and field test results." ASHRAE Transactions 108.1 (2002): 841-857. (Year: 2002).

Wang, Huijuan, and Wenrong Yang. "An iterative load disaggregation approach based on appliance consumption pattern." Applied Sciences 8.4 (2018): 542. (Year: 2018).

* cited by examiner

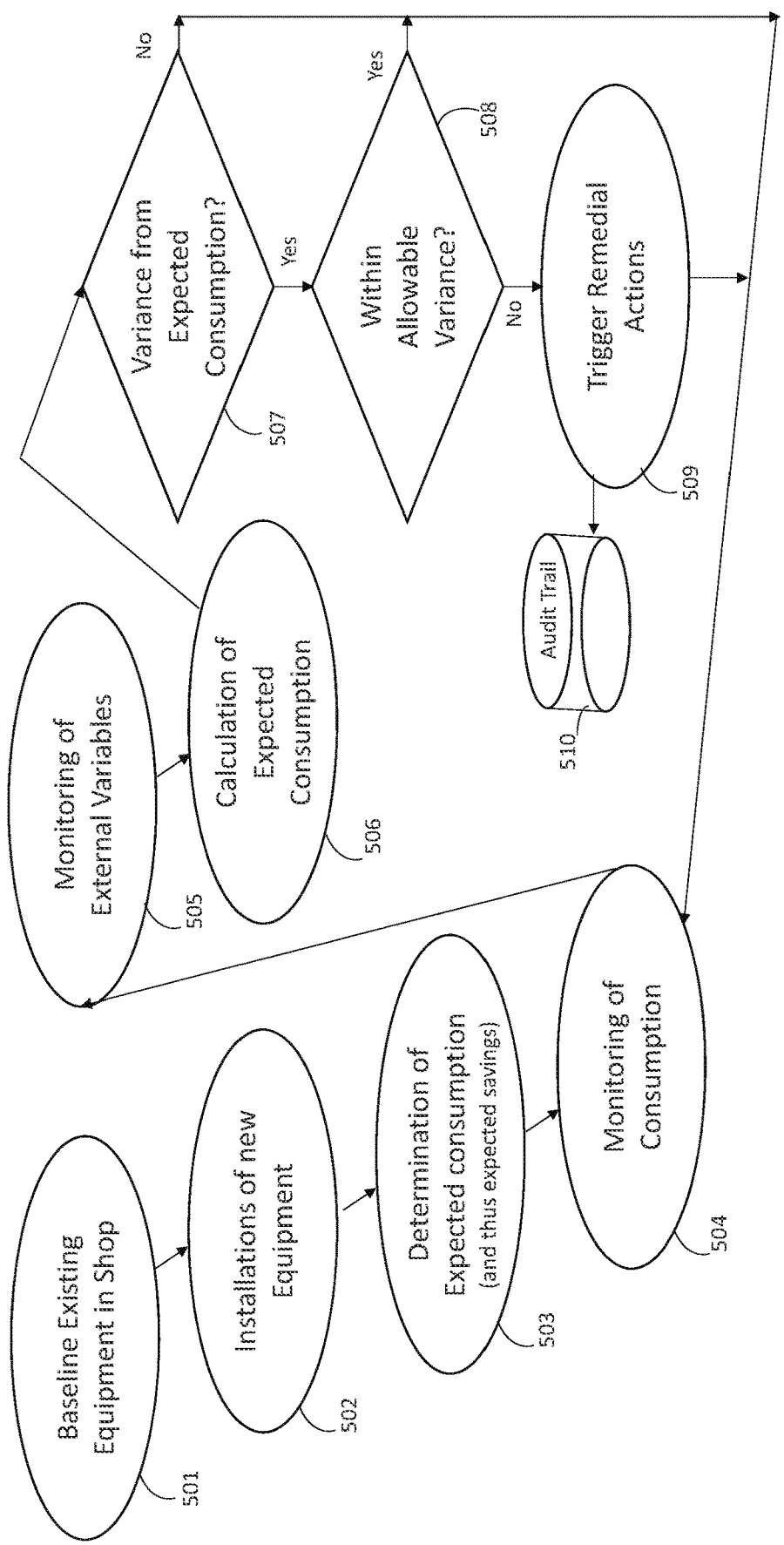
FIG. 1. Typical flow in baselining, monitoring and exception handling in a typical energy savings program

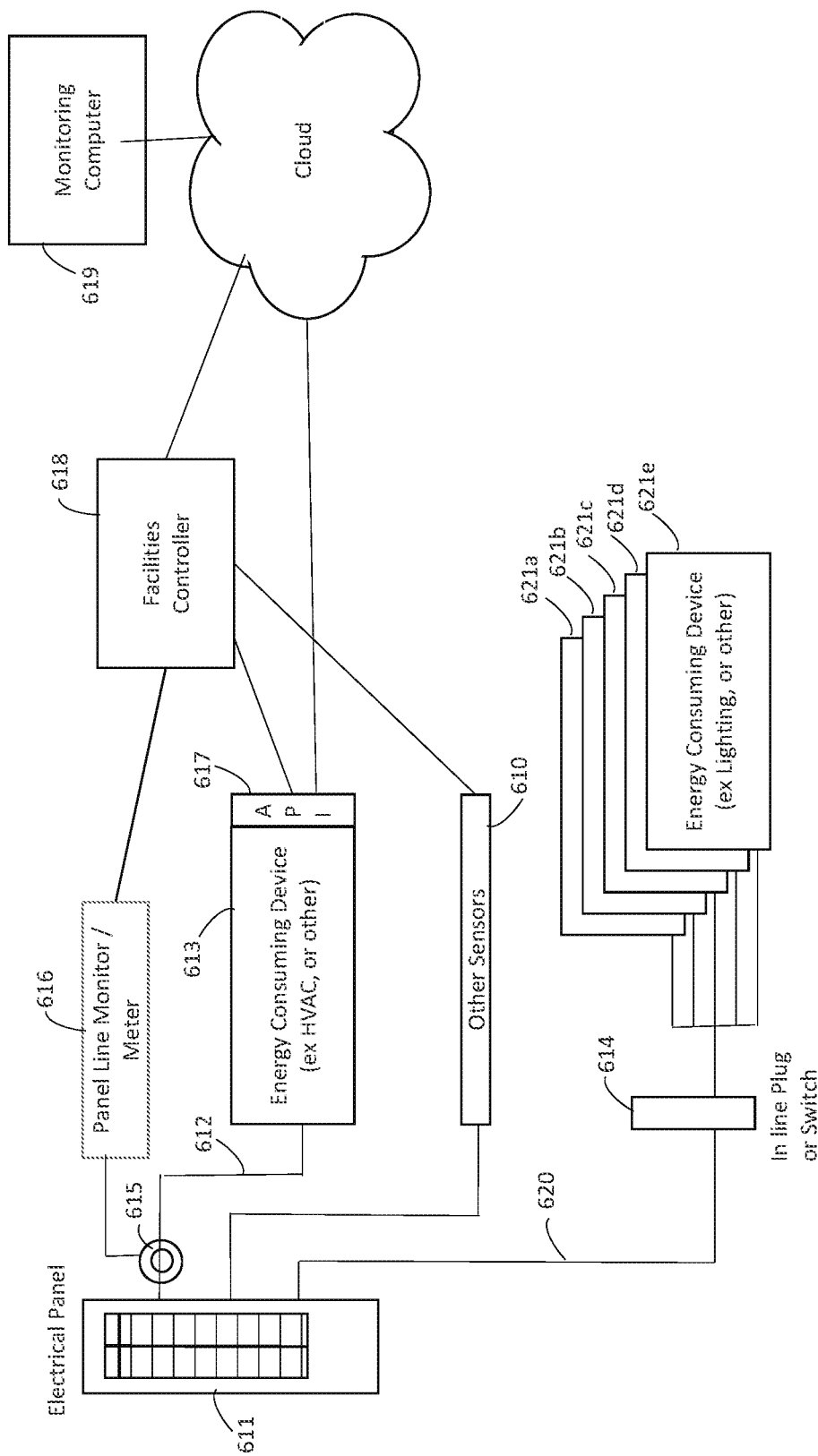
FIG. 2. Typical collection points for energy usage capture via monitoring

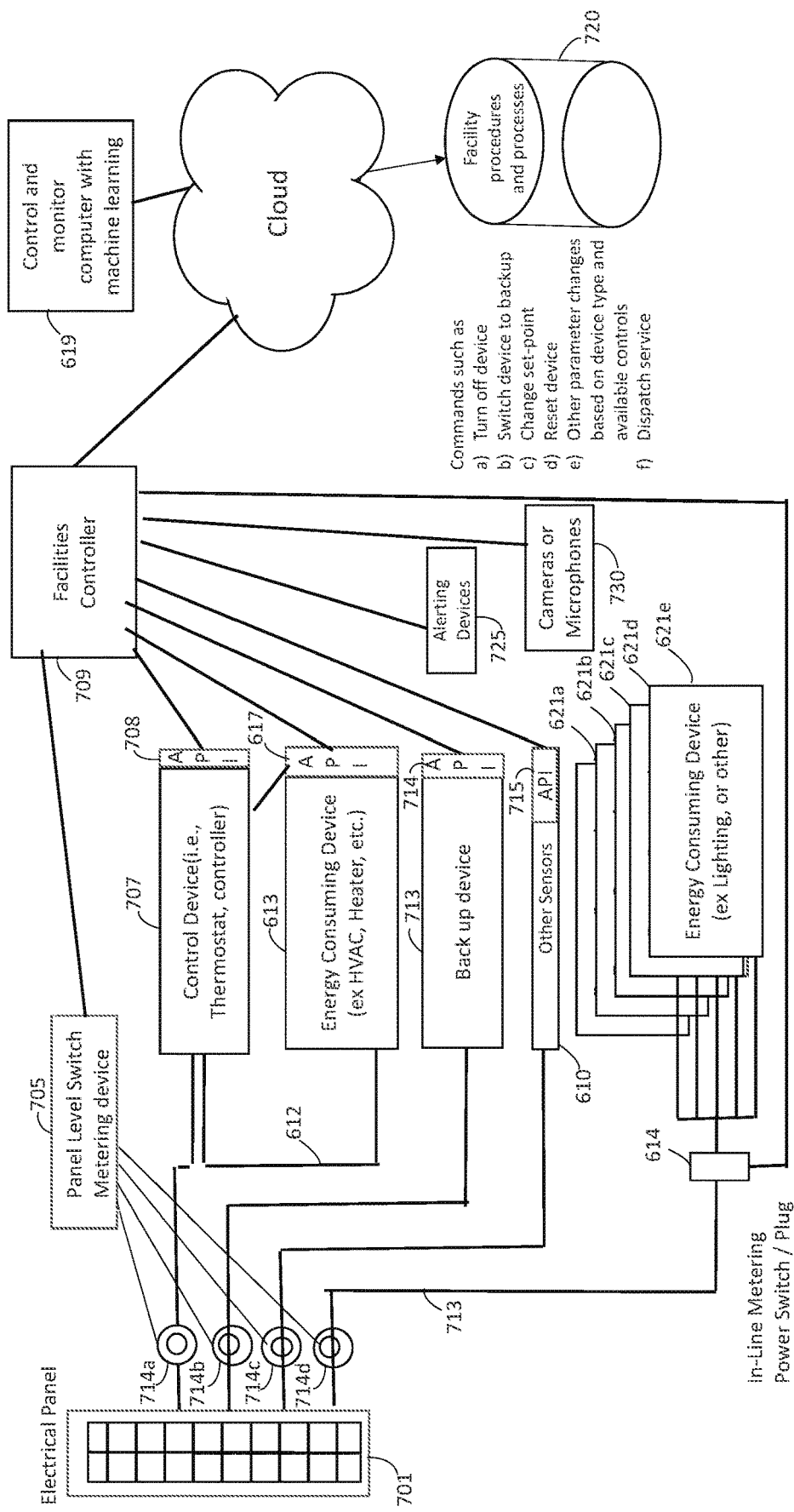
FIG. 3. Typical remedial actions possible on remote device

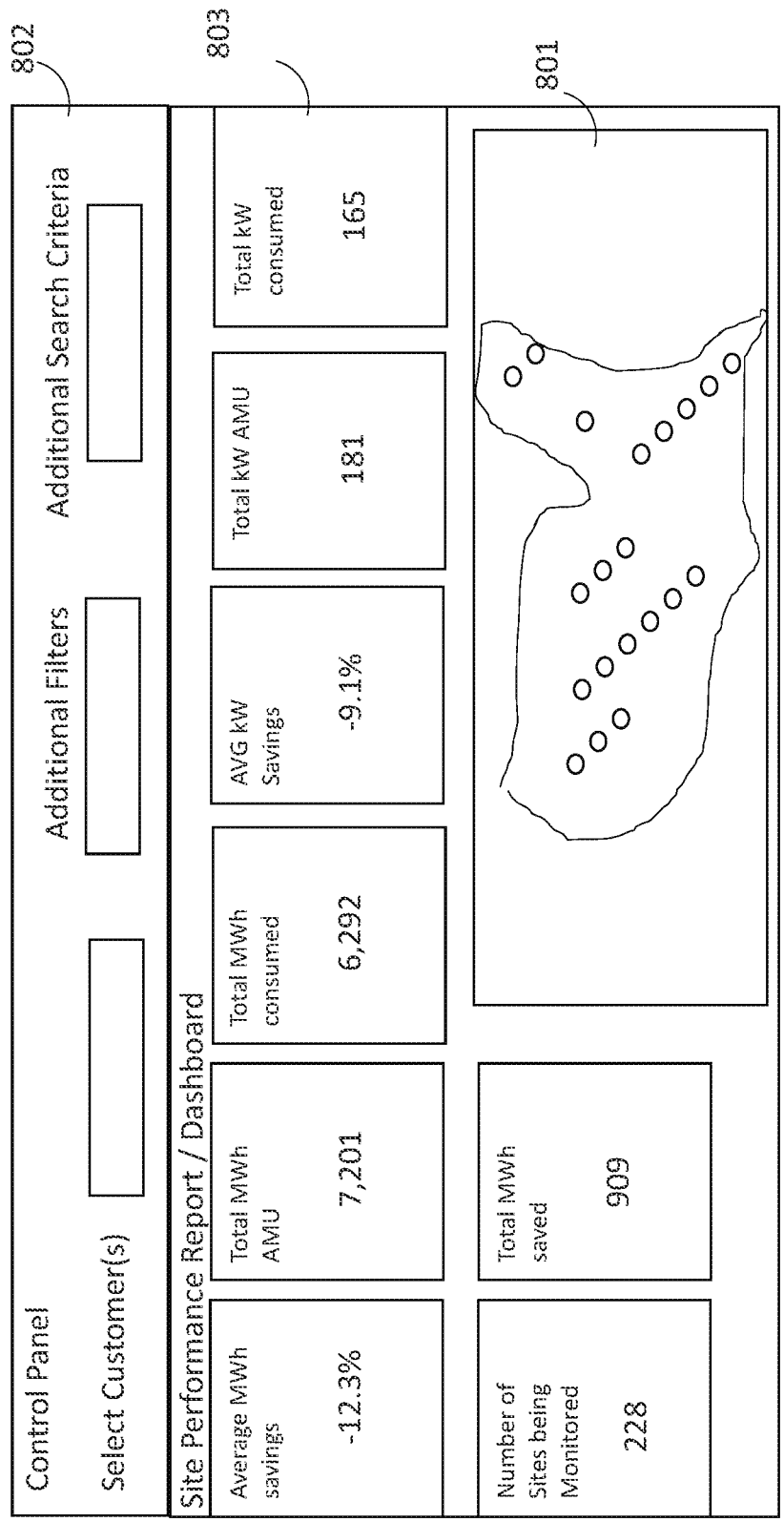
FIG. 4. Typical geographic dashboard view of multiple facilities being monitored and/or controlled

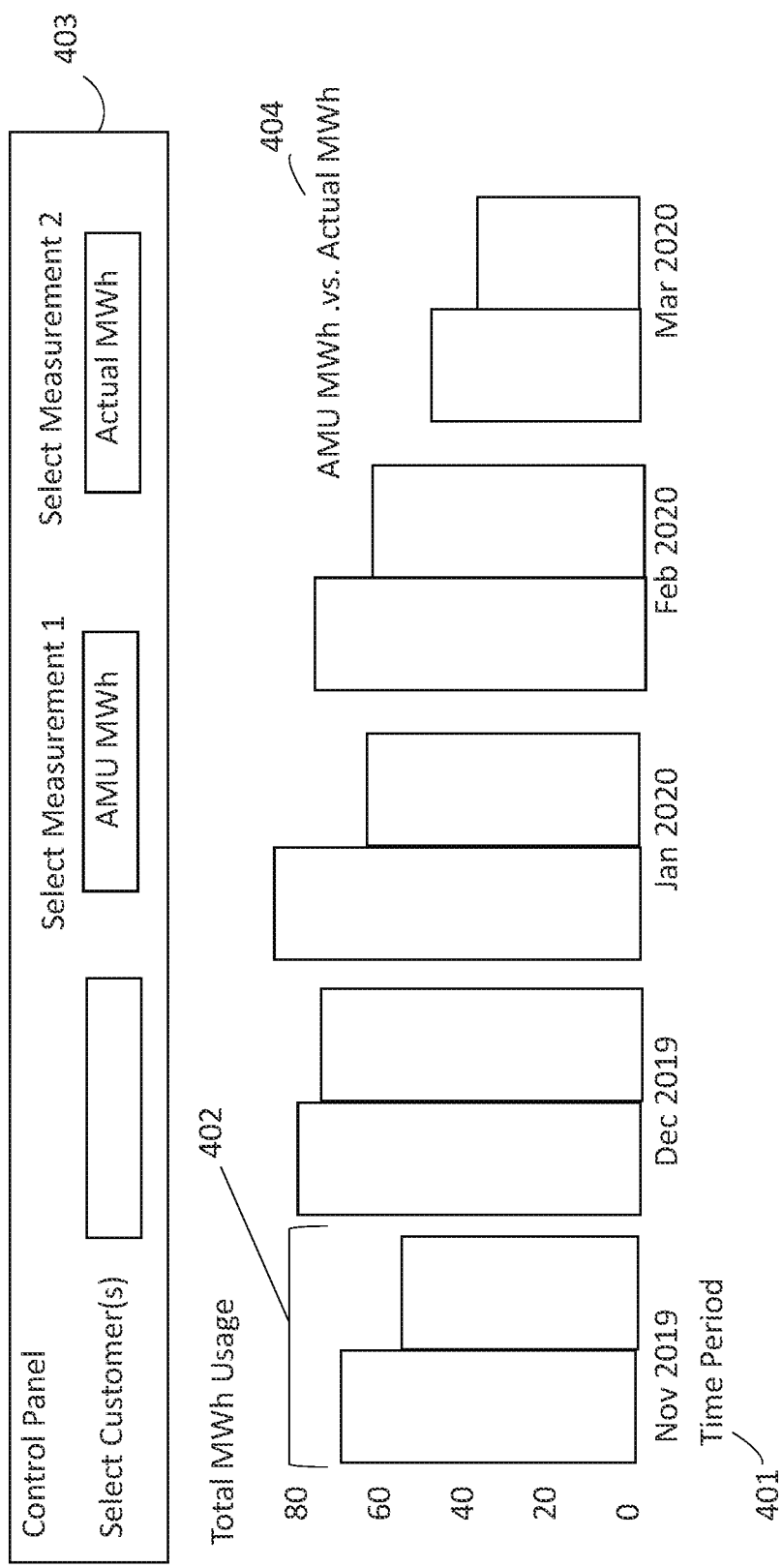
FIG. 5. A statistical view of savings over time

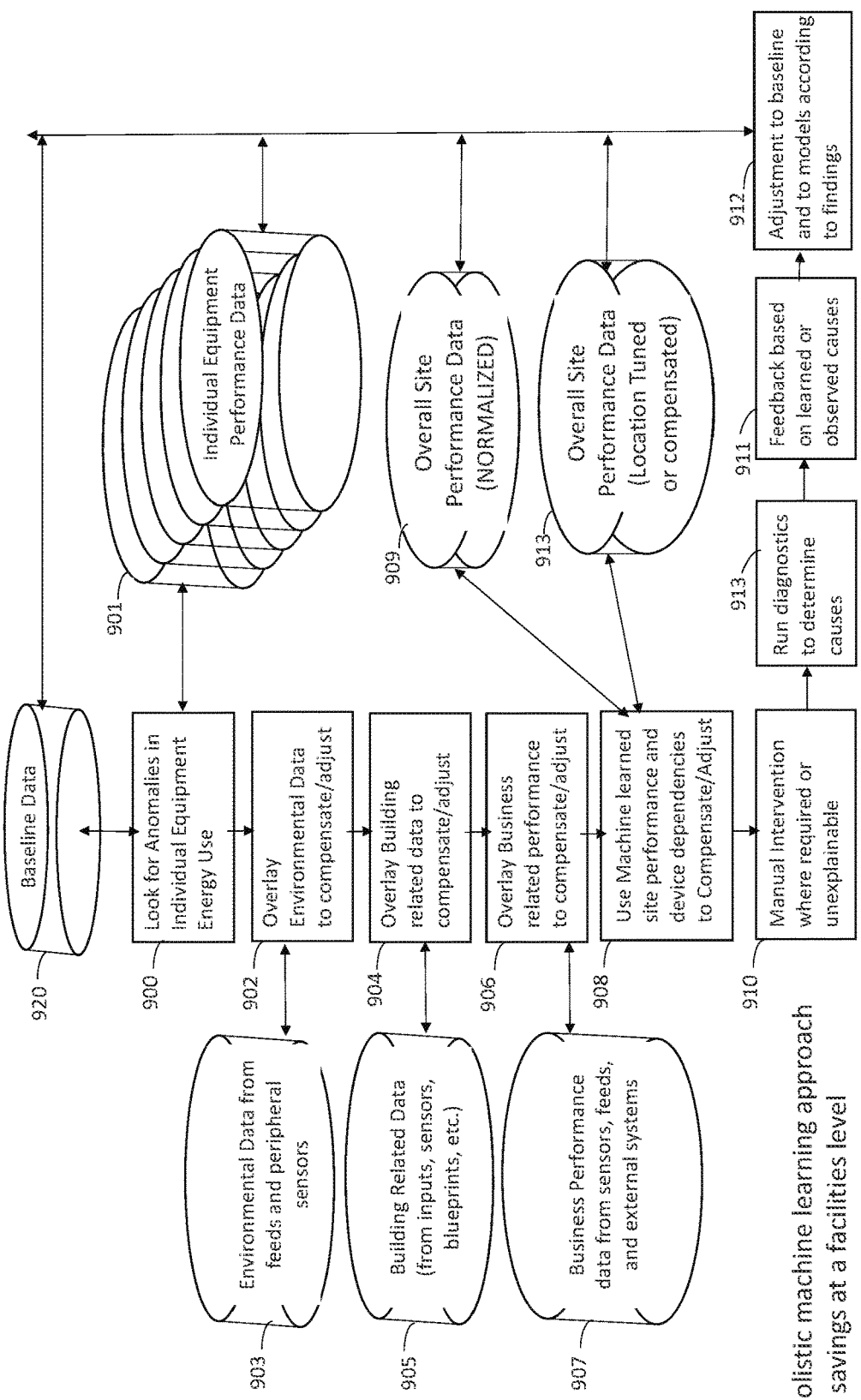
FIG. 6. A holistic machine learning approach to savings at a facilities level

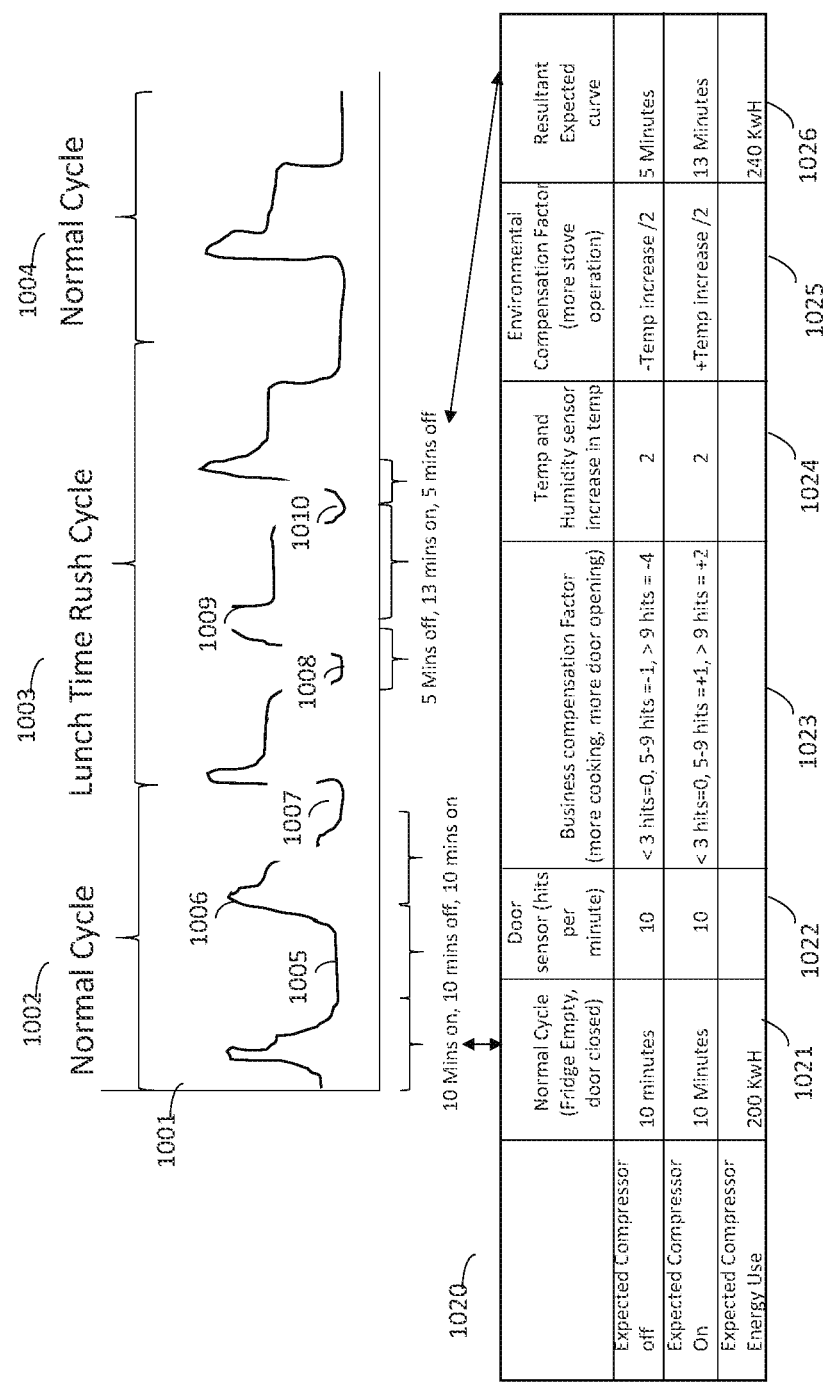
FIG. 7. Energy usage curves for illustrating a compensation table for business and environmental factors

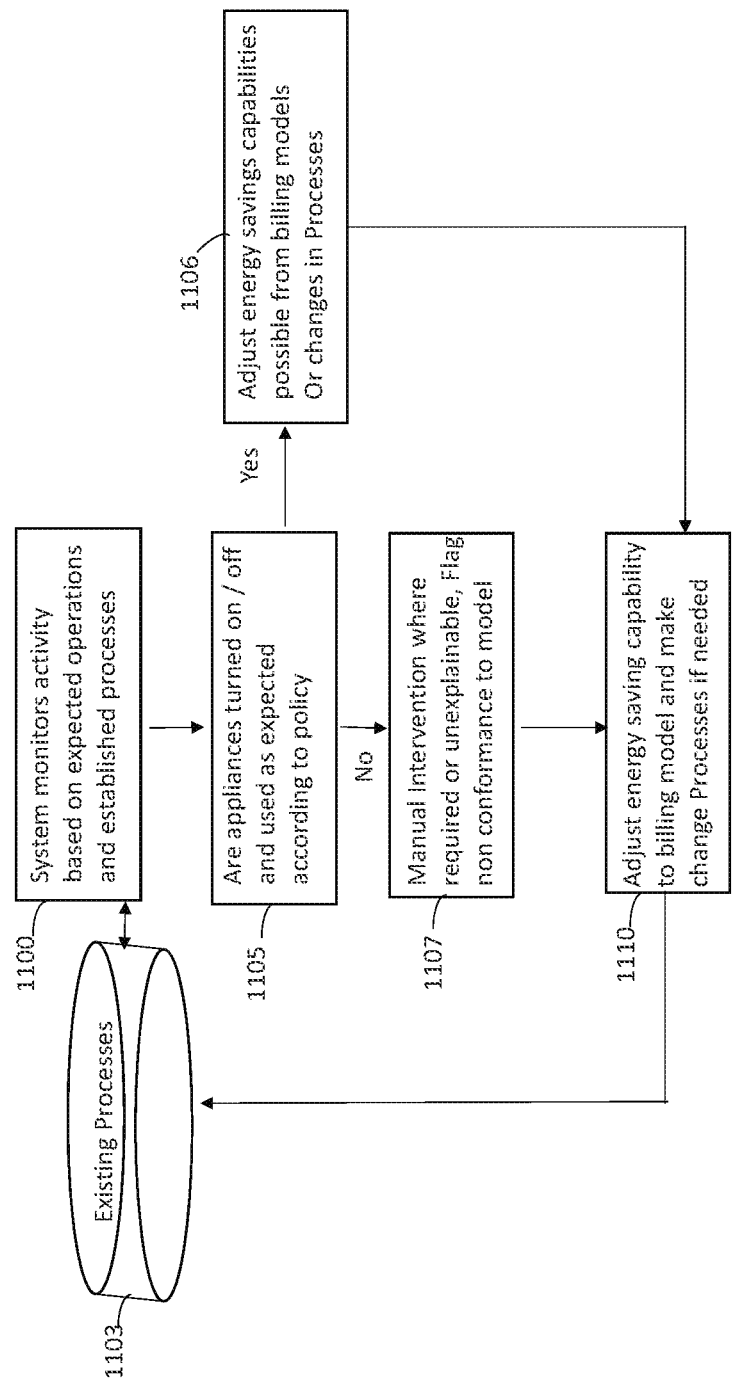
FIG. 8. Adjusting facility procedures based on energy measurement.

ELECTRICAL EQUIPMENT FAULT DIAGNOSIS AND CONTROL

FIELD OF THE INVENTION

The present invention relates to systems and methods using machine learning for monitoring and adjusting the function of energy consuming devices across a facility to diagnose operations when these deviate from expected trends. A system of thresholds and alerts combined with machine intelligence is used to trigger equipment setpoints and enable/disable circuitry to correct malfunctions and adjust for suboptimal equipment performance or interactions between equipment and overall facility energy consumption performance.

BACKGROUND OF THE INVENTION

Consider the energy consumption of a building or facility and the various equipment drawing electrical current. This is a dynamically changing system that varies with the number of people at the facility at any given time, their setpoint preferences, the tasks they may be performing, the purpose and function of the facility, as well as the layout and structure of the building.

Environmental factors including for example, the amount of daylight hours, the wind direction, the amount of direct sunlight can all impact the amount of energy consumed at the facility. Additionally, type of building materials used to construct the building, the number of externally exposed walls, the type and number of windows, the condition of weather proofing, and so on, can all deeply impact energy usage and the frequency at which equipment in the facility must operate.

Equipment utilizing energy (e.g., electricity, natural gas, oil, propane, etc.) may be installed in a non-removable fashion in the facility including for example, hard-wired lights, commercial freezers and ovens, HVAC equipment, water heating equipment and so on. Removable equipment may also be connected to the building energy systems by means of being plugged into various electrical outlets throughout the facility at various times.

While most equipment is provided with information relating to the running power usage of the equipment, it is difficult to accurately predict an overall energy consumption of a facility due, in part, to the large number of variables. These variables include variations in power consumption in the equipment itself as the equipment ages including maintenance or lack thereof, the manner of use of the equipment and environmental factors. It is difficult to ascertain whether each piece of equipment is working as expected or if some equipment is working less efficiently or if there are equipment related faults or external factors negatively impacting operation. These problems may be compounded by the fact that the equipment may continue to serve its intended purpose (e.g., the food is kept frozen, the space is heated, etc.) but the equipment is running sub-optimally having to working harder or longer than should be expected. This results in higher energy costs, more repair costs and shortened lifespan of the equipment.

Initially, when looking at the historical performance of any one device at a facility, a pattern of energy use emerges which can be mapped to detect whether a device is operating according to established norms. This is frequently done by ignoring normal deviations caused by routine activities (e.g., when a door is opened, or other external factors are introduced) and then measuring again when these factors are no longer present to see if the devices operation returns to the expected cycle. This approach is effective in discovering equipment faults (e.g., leaky seals, dirty coils and kinked lines), however, is not effective in determining the devices performance in dynamically changing environments. For example, it could be that intense non-periodic activity may cause the equipment to work outside of expected norms. This can be very challenging for algorithms to compensate for as there may be more "exceptions" than "normal" periods from which to measure and compare data. As such, measurements used to extrapolate expected energy use would be off considerably seeing as these variable equipment operating conditions are in fact, considered normal operation in such a case.

Additionally, even when devices operate within normal and expected limits, external factors influence operation. In one instance, opening of the door to take out supplies during normal business operations letting warm air into a refrigerator must be taken into account. In another case, a hot stove next to a refrigerator that is operating constantly causes the refrigerator to work harder. Any attempt to estimate energy use for a facility that does not factor these types of common event would be inaccurate.

Non-common events could also impact energy usage, such as a refrigerator door remaining partially open. This type of event should not be disregarded because there is an opportunity to correct the event.

Finally, even when factoring in aspects such as the aging of equipment to the device level measurements and the interaction effects across devices and their environments which affect their consumption causing variations to these expected patterns, without an understanding of the overall system and the combination of devices optimization opportunities can be missed.

Monitoring and optimizing energy use at an individual piece of equipment, while good, only brings a limited amount of efficiency. Knowledge of the overall facility coupled with monitoring and control of the individual pieces of equipment can provide a framework for facility equipment optimization. For example, a facility that has large peaks or a large variation in energy use will pay more than one the manages to consistently use energy minimizing peaks and valleys even when the total energy consumption is identical. However, control and optimization of this aggregate usage requires a view of the individual pieces of equipment in a facility and their relationships with external factors and any interdependencies. With the addition of machine learning, the optimizations performed on a facility can be monitored and tracked to detect and react to anomalies in near-real time keeping the energy efficiency programs on track.

What is missing however, is a normalized and compensated set of data that can account for these interactions to both detect when equipment is operating poorly and when abnormal influences have occurred. What is also missing is the ability to estimate energy savings opportunities when upgrades are contemplated for a facility. Even after their installation, the high number of variables in the system makes it difficult to determine the savings obtained with any level of confidence without such a system.

U.S. Pat. No. 9,569,804 (Stein) discloses a system for energy consumption and demand management where factors such as statistical energy usage are compared to external and environmental variables.

U.S. Pat. No. 8,370,283 (Pitcher) teaches a method of predicting energy usage for a single piece of equipment.

U.S. Pat. No. 10,770,898 (Beheshti et al.) teaches normalizing energy use intensity values to compensate for variations in energy usage due to environment.

None of the cited references however, contemplate benchmarking data from other similar sites or from other similarly installed equipment. None of the cited references teach applying machine learning to systems including multiple energy consuming pieces of equipment. In all of the cases cited above, if a facility included an incorrectly sized HVAC system installation, this system could potentially run very inefficiently and that oversight and any potential savings would not be found. Rather, all of those systems could report excellent performance relative to past performance and not raise any alarm.

It would thus be desirable for a system to have a set of baseline data from measuring energy use from individual pieces of equipment in a facility that establishes patterns for all such energy consuming equipment normalizing these across external influences. Such a system could determine whether such equipment was operating optimally and could trigger actions when anomalies were detected.

It would also be desirable for a system to combine the above readings adding a compensation factor for normal business and environmental data such that even when equipment was functioning within operating parameters, changes in energy consumption that did not follow expected norms based on changes in business, any cross-device effects, and environmental data could be flagged.

It would also be desirable to have system that could estimate the energy consumption of a facility and take into account any specific energy upgrades deployed at a facility, business type and volume, the utilities billing model and any cross-device effects using these established baselines to benchmark facilities and equipment to tell whether or not the facility or the upgrades were working efficiently.

It would be further desirable if such a system were to determine potential savings at a facility contemplating the installation of upgrades and as well as recommend upgrades for a facility based on previous benchmarks. Such a system might also be able to detect whether all of the devices within such a facility were operating efficiently, not only by comparing these to historical data from the same facility but by using benchmarks established by similar installations at other facilities.

It would thus be very beneficial to have a system capable of applying machine learning and utilizing environmental factors along with equipment, business and equipment related data to determine a baseline for a facility. It would be further beneficial to be able to use such a baseline to assess how a building is performing independent of prior historical data but rather computed directly from baseline data created from similar facilities using similar equipment.

Therefore, a need exists for a system that can apply machine learning to systems comprising multiple energy consuming devices at a facility to establish benchmarks at a facility level based on both individual pieces of equipment and their energy consumption as well as taking into account relationships between the individual pieces of equipment as well as business and environmental factors.

SUMMARY OF THE INVENTION

What is desired then is to provide a system and method that can measure, predict and model energy utilization for a facility having many energy consuming devices based on a measured energy usage signature taking into account interrelationships between devices and the impacts of external factors.

What is also desired is to provide a system and method that can apply machine learning to measure, predict and model energy utilization for a facility having many energy consuming devices.

What is further desired is to provide a system and method that compares a facilities energy utilization to a baseline representing expected energy utilization, which has been created from similar facilities in order to assess expected energy usage.

What is still further desired is to provide a system and method that uses historical data and knowledge about the billing models coupled with machine learning to improve the accuracy of the energy predictions over time and is also capable of diagnosing aberrations to the expected patterns taking into account relationships between the individual pieces of equipment as well as business and environmental factors.

With the prevalence of low-cost sensors and Internet of Things (IoT) devices, it is possible to monitor virtually all aspects of a facility to obtain the data needed to form such correlations. This can be accomplished using sub-metering, smart plugs and sensors for environmental and business activities. This allows a system to monitor at an electrical outlet level, at a room level or even within proximity of devices. Additionally, outside feeds of environmental data allow for real time (or near real time) data for dynamic power signature adjustment. U.S. patent application Ser. No. 17/110,961 filed on Dec. 3, 2020 to which this application claims priority, provides for a system that utilizes artificial intelligence to monitor, learn and adjust the functioning of energy consuming devices, the specification of which is incorporated herein by reference.

The result is a system and method that can react quickly to inconsistent energy usage that does not adhere to the expected energy usage patterns. These changes in patterns should be detectable and intelligent data can be extracted from the observed deviation in patterns. External influences such as environmental variations can be correlated and factored in with the specific device operation. Business variation can be derived, in part, through sensors showing movement, door openings, room occupancy and volume of production. For example, food preparation cycles in a restaurant setting.

Further, even when making changes through the installation of energy efficient devices or other energy savings initiatives, it is difficult to measure the impact of these without an adjusted baseline. If an intelligent baseline that adjusts for external factors and dependencies is achieved, the impact of such changes would be measurable and predictable.

In particular, a system and method is provided that incorporates self-learning software that monitors a variety of input data from various equipment that is being measured throughout a facility along with external sensors and feeds providing business volume and environmental data. The system "learns" patterns of operation for the equipment and adjusts for this based on environmental data creating a baseline. These baselines are further used to benchmark similar facilities and similar equipment at other facilities.

A set of normalized data (stripping out influences) is created to compare device operation regardless of environment. The system specifically increases the operating efficiency of the computer-based monitoring system by adjusting the baseline with expected operational data for the equipment taking into consideration things such as the age, efficiency, and life expectancy of the equipment. This data allows the system to determine if a particular piece of equipment at the facility is operating according to the established benchmarks for the equipment, independent of the environment.

A second set of compensated data is created which includes and factors in the influences present in the normal operation of the system. The system accounts for normal influences from the environment and business dynamics to create a model of how the devices would be expected to consume energy and adjusts this model under the normal operation of the business predicting and compensating for these influences on the expected energy consumption of the equipment. Abnormal variations to these patterns are detected by comparing the compensated or location tuned expected behavior with what is actually measured. This data allows the system to determine how the facility and all its equipment is functioning as a whole in relation to the business volume and environment.

The system can also account for energy consumption billing nuances from the utility providing the energy. For example, utilities can adjust energy consumption rates based on time of day, seasons, tiered levels, consistency of use, and peak demand. The result is a system that self-learns and self-adjusts accounting for device performance within the context of the overall business resulting in much greater operating efficiency through the accurate detection of anomalies, reduction in false positive alarms for both the computer-based monitoring system and the equipment that is being monitored, and adherence to efficient energy use with respect to billing models.

It should be noted that the system described herein provides for monitoring and characterizing the energy usage at a facility employing many energy-consuming devices/equipment via a network connection to a computing device. The system allows for automated issuance of remote-control commands, maintenance or diagnostic commands including the triggering of service calls for the checking and/or replacement of equipment or the changing of procedures or deployment of service personnel to optimize energy efficiency and react to any failure, pending failure or degradation of equipment or substantial deviation to the expected energy consumption can occur.

In some instances, the automated action may comprise taking additional and different types of diagnostic measurements including running the equipment through a diagnostic sequence to gather more comprehensive data. In other instances, the automated action may comprise adjusting the running of the equipment to a preset level while or until the detected deviation from the expected energy pattern can be resolved. Still further, the automated action could comprise running the equipment through a sequence of steps that are modified based on the gathering of more comprehensive data from a measurement device or a set of related and potentially separate independent sensors or external feeds providing data from existing databases or data gathering services, such as weather networks. In another configuration, the automated action could be to adjust the running of one or more pieces of equipment across the facility.

Additionally, a peripheral or secondary device may be provided that includes a controller, one or more peripheral sensors coupled to the controller configured to detect one or more in room parameters, e.g., occupancy, contact sensing such as door openings, and the like via a wireless communication interface. The device may also communicate through low power wireless signals, such as Wi-Fi, to a remote computer system, which may store data from the sensor(s), analyze the data, generate an action, and/or generate reports and alerts based at least in part on the data. This data can also come from external feeds, manual inputs, or interfaces with existing environmental data feeds. This peripheral or secondary data can be correlated with the first device data to alter the model reflecting expected energy consumption. This normalization makes it possible to adjust for the impact of external factors and both normalized and compensated data sets continue diagnosing equipment operation within the context of the operating environment allowing for dynamic adjustment based on the secondary data.

In an exemplary embodiment, these sensors are placed in a facility to capture temperature, humidity, and room occupancy or business activity along with the power consumption of equipment. A single sensor for temperature and occupancy may be used depending on whether it is desired to measure temperature and occupancy in multiple places in a facility. For the interaction between equipment, it may be desirable to measure the temperature in the vicinity to a given equipment to accurately reflect the impact temperature may have on the functioning of the equipment. It will be understood by those of skill in the art that the sensor measuring power consumption captures data at intervals sufficient to map a baseline. This would include turning the equipment on, measuring the equipment while it is running, and cycling the equipment off. It is contemplated that multiple cycles should be measured. In one configuration, non-sequential cycles may be measured taken at different times of the day. IoT sensors allow for the ability to report data in real time.

In still another configuration, the system compares detailed usage of equipment at a facility comparing these with benchmarked data and initiates remedial action if facilities are underperforming. This remedial action can include a remote-control change of settings, the disabling of equipment and/or enabling of replacement or alternate equipment to better serve the facility or a dispatch of technicians.

In accordance with another configuration, the system estimates expected savings from equipment upgrades so that new baselines are created for the more efficient equipment. The reduced energy usage is determined from historical measurements of the same or similar equipment, knowledge of the environment, the previously deployed equipment, and knowledge of the business activity as it translates into the duty cycle of the equipment. Tight control of energy consumption can also account for billing rate factors such as peak demand and differing rates for times of day. The operation of the equipment should also be controlled so as to minimize the cost of operation based on the variable billing rates. As a practical matter, this can be achieved by the scheduling of "normal" activities such as defrost cycles or modifying HVAC setpoints to account for peak demands on energy at the facility. It is further contemplated that multiple facilities could be controlled in this manner to ensure the aggregate energy consumption of a plurality of facilities can be maintained below a specified level.

In another configuration, the system shows historical data and comparative data in the form of a dashboard as a graphical user interface on a computer in various easy to understand and compare formats from multiple sources allowing an operator to easily and visually benchmark and compare different equipment at different sites, as well as to compare one site against others.

In another configuration, the system shows benchmark data including measurements over time of particular types of equipment in a dashboard like view allowing a user to see and compare equipment from the same manufacturer to look at variances across equipment as well as variances over time to measure degradation and potential for imminent failure.

It is further contemplated that the system will display measurements over time for different types of equipment that perform the same or a similar function allowing for comparison of the equipment.

In addition, the invention is further directed at predicting and benchmarking similar sets of facilities with similar equipment installed to determine underperforming facilities and providing recommendations for remedial actions.

For this application, the following terms and definitions shall apply:

The term "data" as used herein means any indicia, signals, marks, symbols, domains, symbol sets, representations, and any other physical form or forms representing information, whether permanent or temporary, whether visible, audible, acoustic, electric, magnetic, electromagnetic or otherwise manifested. The term "data" as used to represent predetermined information in one physical form shall be deemed to encompass any and all representations of the same predetermined information in a different physical form or forms.

The term "network" as used herein includes both networks and internetworks of all kinds, including the Internet, and is not limited to any particular network or inter-network.

The terms "coupled", "coupled to", "coupled with", "connected", "connected to", and "connected with" as used herein each mean a relationship between or among two or more devices, apparatus, files, programs, applications, media, components, networks, systems, subsystems, and/or means, constituting any one or more of (a) a connection, whether direct or through one or more other devices, apparatus, files, programs, applications, media, components, networks, systems, subsystems, or means, (b) a communications relationship, whether direct or through one or more other devices, apparatus, files, programs, applications, media, components, networks, systems, subsystems, or means, and/or (c) a functional relationship in which the operation of any one or more devices, apparatus, files, programs, applications, media, components, networks, systems, subsystems, or means depends, in whole or in part, on the operation of any one or more others thereof.

The terms "process" and "processing" as used herein each mean an action or a series of actions including, for example, but not limited to, the continuous or non-continuous, synchronous or asynchronous, routing of data, modification of data, formatting and/or conversion of data, tagging or annotation of data, measurement, comparison and/or review of data, and may or may not comprise a program.

The terms "first" and "second" and "third" are used to distinguish one element, set, data, object or thing from another, and are not used to designate relative position or arrangement in time.

In one configuration, a system for automatically learning and adapting to the energy usage of an equipment operating according to a control input, the system comprising: a computer having a storage and coupled to a network, an energy consumption sensor and at least one peripheral sensor each associated with the equipment and coupled to the computer, and software executing on the computer including a baseline energy usage signature for the equipment. The system is provided such that the energy consumption sensor measures an energy consumption of the equipment during a first measurement period and generates first energy consumption data, and the at least one peripheral sensor measuring a parameter during the first measurement period and generating first peripheral measurement data. The system is further provided such that the software modifies the baseline energy usage signature based on the first energy consumption data and the first peripheral measurement data to generate a modified baseline energy usage signature, and the energy consumption sensor measuring an energy usage of the equipment during operation of the equipment and generating energy usage data. Finally, the software compares the energy usage data to the modified baseline energy usage signature to determine if a threshold deviation has been reached, the threshold including both magnitude and timing characteristics, and when the energy usage data exceeds the threshold deviation, the software initiates an action associated with the equipment selected from the group consisting of: running the equipment through a diagnostic routine, setting the equipment to a preset level of operation, setting the equipment to a preset duration of operation, turning the equipment off, cycling the equipment, generating an alarm and combinations thereof.

In another configuration, a method for automatically learning and adapting to the energy usage of an equipment operating according to a control input with a computer having a storage and having software executing thereon and coupled to a network is provided, the method comprising the software performing the steps of: measuring energy consumption of the equipment during a first measurement period with an energy consumption sensor and generating first energy consumption data, transmitting the first energy consumption data to the computer, and measuring a parameter during the first measurement period with a peripheral sensor and generating first peripheral measurement data. The method further comprises the steps of: transmitting the first peripheral measurement data to the computer, and modifying a baseline energy usage signature for the equipment based on the first energy consumption data and the first peripheral measurement data to generate a modified baseline energy usage signature. The method still further comprises the steps of: measuring an energy usage of the equipment during operation with the energy consumption sensor and generating energy usage data and comparing the energy usage data to the modified baseline energy usage signature to determine if a threshold deviation has been reached, the threshold including both magnitude and timing characteristics. The method is provided such that when the energy usage data exceeds the threshold deviation, the software initiates an action associated with the equipment selected from the group consisting of: running the equipment through a diagnostic routine, setting the equipment to a preset level of operation, setting the equipment to a preset duration of operation, turning the equipment off, cycling the equipment, generating an alarm and combinations thereof.

Other aspects and features of the present invention will become apparent from consideration of the following description taken in conjunction with the accompanying drawings.

BRIEF DESCRIPTION OF THE DRAWINGS

FIG. 1 is a drawing of the typical flow in baselining a facility for the energy savings program.

FIG. 2 is a block diagram showing the collection points and monitoring points of a sample piece of equipment at a facility according to one configuration.

FIG. 3 shows a block diagram depicting typical remedial actions available for energy usage capture via monitoring according to the system of FIG. 2.

FIG. 4 depicts a typical geographic dashboard view of multiple facilities being monitored and/or controlled according to the system of FIG. 2.

FIG. 5 shows a statistical view of savings over time in a dashboard view according to the system of FIG. 2.

FIG. 6 shows a holistic view to utilizing machine learning at a facility level according to the system of FIG. 2.

FIG. 7 shows an example energy usage curves for a piece of equipment and illustrated compensation table for business and environmental factors.

FIG. 8 shows the facility energy management system adapting operating processes based on energy use and billing information according to the system of FIG. 2.

DETAILED DESCRIPTION OF THE INVENTION

The reference numbers in specific figures refer to elements in those figures. Turning to the drawings, FIG. 1 shows a typical flow in baselining a facility for the energy savings programs.

Initially monitoring equipment is installed in the facility and measurements are taken (501) in order to form an existing baseline for the facility. Once the baseline is established, new equipment is installed (502) with the goal of obtaining expected energy reductions.

Based on the type of equipment installed, the environment and the expected duty cycle, a determination of expected energy usage is made (503), which can be used to estimate reduced energy costs.

Once the equipment is installed (502) and the baseline expected savings is calculated (503) against a known baseline (501), monitoring (504) of energy consumption takes place and the measurements of actual savings are compared to expected savings.

External variables (505) are captured through the use of peripheral sensors or external feeds such as weather and operating conditions, which may affect energy consumption, and these are combined with the monitoring data (504) to make a calculation of the expected energy consumption (506).

If there is a variance of expected versus actual savings (507) then a set of thresholds determining allowable variances (508) are measured. The thresholds may be absolute power consumption values but may also be dictated by the billing model with some additional weighting. Examples include "tiers" of energy use where crossing over to the next "tier" may impact billing rates, and thus tighter constraints are places of the facility as it nears these thresholds. If the established thresholds are not met, then remedial actions (509) are taken, which may include dispatching of a technician, shutting down equipment to prevent failures, changing setpoints and the timing of certain operations and so forth.

Both abnormal and normal variances may occur where normal variances are part of the expected consumption (503) based on the monitoring of external variables (505) and the calculations made on expected consumption (506). Abnormal variations would trigger exceptions and remedial actions (509). These remedial actions may include device repairs and maintenance, but may also include changes to operational processes, setpoints or procedures.

Some simple examples of such situations include a clothes dryer with a blocked vent due the buildup of lint. Here, while the clothes may still get dry, the dryer will require more time and thus use more energy to dry a load of laundry. This type of blockage, when detected on the dryer vent filter itself, may be easy to detect and resolve. However, it will be understood that vents can also get blocked further down in the exhaust tubing, may experience a folded or crimped exhaust tube, or a blocked exit vent making diagnosis more difficult. The entry of heated and humid air into a facility may also negatively impact the HVAC system performance, which must now perform additional cooling cycles to compensate.

Even under normal business circumstances when considering a kitchen containing a baking oven, it would be reasonable to expect the interior temperature to rise as the ovens operate. This would in turn, cause the HVAC to operate harder in order to compensate for the additional heat coming from the ovens as food is being prepared. Further, when vents are in operation pulling air-conditioned air out of the premises, it also causes the HVAC to work harder. This is calculated as part of the expected consumption (506) using adjusted or compensated models.

Another example is a hot water heater that has a leaking pressure release valve. While hot water is available for normal operations, the constant outflow of hot water through the pressure release valve into the drain requires the hot water heater to heat much more water than it would under normal circumstances resulting in a higher energy bill. Once again, the problem may be difficult to detect as the hot water heater seems to be operating normally as hot water is adequately supplied. Similarly, one or more leaking faucets dripping hot water would also generate a loss of heated water and a subsequent increase in energy use by the hot water heater. In these types of cases, these energy "leaks" are not calculated as part of the expected consumption (506) and would generate alerts and remedial actions (509) as they would not resolve with the expected usage under the given environmental and business circumstances.

Yet another example would be a freezer with a leaking seal. Depending on the magnitude of the leak, it is conceivable that the freezer still manages to hold a steady temperature in the desired range. To do so however, requires additional cycles of the compressor due to the leakage of the faulty seal. Here again, it may not be obvious that such a problem exists, and one may continue to operate the freezer as if all were normal but in so doing, wasting energy and increasing costs due to the compressor cycling more frequently than it would if the freezer had a sound seal.

The resultant cost of such problems can add up quickly, and if undiagnosed and left uncorrected resultant energy bills increase and energy is wasted. Likewise, the lifespan of the equipment is reduced because of the increase run time. It is often the reception of the energy bill from the utility that is the first indication of a potential problem where an increased overall cost is detected. This may be the only symptom, and by this time the energy has been used and the resultant cost has already been added to the bill. Even then, the change may fall within seasonal variances and therefore go undetected and no action taken. Depending on the issue, the degraded system may become the "new normal" and simply accepted with the increased cost leading to an ongoing cycle of wasted energy and unnecessary costs.

Often these problems arise slowly with creeping incremental costs making them harder to identify. The system may continue to degrade adding incrementally more and more energy cost as the problem worsens. Depending on the rate of change and perhaps the overall contribution of the individual circuit to the whole, these increases may also go undetected and addressed until the system in question fails completely. If the hot water heater running full time triples the cost of the hot water heated but this amount is only 1% of the overall energy bill for a large building with many such heaters, even such an increase in energy cost and drastic waste of energy may go unnoticed. There may be many such ongoing issues throughout any given building that are undiagnosed and unaddressed. It is thus important that the expected consumption (506) based on the normalized and compensated values derived from equipment baselines (501) and peripheral sensors and feeds or external data (505) and the thresholds used in the variance (507) calculations be set to detect these systems and trigger remedial actions (509) before a large amount of energy is consumed.

To further complicate matters, the people in charge of processing and paying the energy bills may be less attentive to small variances in the energy consumption and cost. These problems may go undetected and unaddressed for long periods of time with each month entailing incrementally more expense than necessary. To make matters worse, these same people may simply budget more for energy use in future based on actual results perpetuating the problem. Thus again, the remedial actions (509) that are triggered are clear cut directions and instructions on what must be done and require little interpretation or analysis.

In addition to the resultant expense increase, many such problems can also affect the lifespan of the equipment and potentially lead to a failure of the equipment resulting in even more cost to replace it along with the additional inconveniences that a failed system brings. A broken freezer may result in a loss of inventory, a failed HVAC unit may result in the temporary closure of a business. Through the tracking of remedial actions (509) and the logging of these in an audit trail (510) there is a historical record.

Turning now to FIG. 2. we see typical collection points for energy usage capture via monitoring. Energy devices (613, 621*a*, 621*b*, 621*c*, 621*d*, 621*e*) can be monitored in one or more ways as depicted. Larger devices such as HVAC units, walk-in freezers and refrigerators and large ovens are often connected (612) directly to the electrical panel (611). In such cases, a panel line monitor or meter (616) is used and deploys a line monitor (615) such as a current transformer, which measures the electrical use of the appliance via the line at the panel (611) where the connection (612) to the energy consuming device (613) is made.

In another case, an inline monitor (614) such as a switch, or a plug with intelligence to measure and monitor load is connected (620) between the energy consuming device (621*a*-621*e*) and the electrical panel (611) to measure, for example, current draw. This monitor (614) can be at the plug level or switch level and monitors all the devices (621*a*-621*e*) that are connected to the monitor. The inline plug or switch (614) is then connected (620) to the electrical panel (611).

In yet another case, a facilities controller (618) or a remote monitoring computer (619) may connect directly to the device (613) via an Application Program Interface API (617) to communicate directly with the device(s) which may have built in functions to measure current use as well as run diagnostics or perform control actions.

In many situations, separate monitoring sensors (610) are deployed to measure things like temperature, humidity, vibration, opening/closing of doors, or room occupancy. These may or may not require separate power and may be connected to the electrical panel (611).

In any of these situations, the monitoring data collected by the panel line monitor (616) through the line monitoring connection (615), or the in-line monitor (614) or directly through the API (617) of the device is collected by a facilities controller on site (618) and may be sent to an optional remote monitoring computer (619). The remote monitoring computer (619) may also in some cases connect directly with the panel line monitor (616), the inline monitor (614) or the API (617) of an energy consuming device (613, 621*a*-621*e*).

There are many ways to capture and look at the energy consumption for comparison sake and for benchmarking a particular facility, or to compare facilities. Metering is one way to get exact usage, but even looking at longer cycles such as Avg KWh for a freezer can be useful to compare its operation under normal operating conditions. Another method is to look at the percentage of the main, or the total power. This also gives a comparative measure as business conditions vary scaling up or down.

When a customer of the utility receives an energy bill, they will likely see only a large aggregate amount of usage listed for the billing period by the utility. This does little to give insight into individual consumption of systems that are running. Without the addition of monitoring equipment, it is impossible to isolate the consumption and to associate it with the devices in the facility, never mind benchmark usage and detect underperforming devices or potentially problematic devices.

Machine learning however, is particularly well suited to address these multi-faceted problems. The correlation of a large number of energy consumption patterns and the analysis of impacts across such a large pool of readings is very complex. Through pattern recognition and learning protocols, machines can detect anomalies in this multi-dimensional space that would be unobvious to those looking at the results. Even if a problem is suspected, diagnosis can be elusive, and machine learning is able to hone in on root causes.

With the advent of smart plugs and other IoT (Internet of Things) metering devices, it is possible to install equipment in a building to capture sensor data (610) and monitor the consumption of one or more energy consuming devices (613, 621*a*-621*e*) and report this utilization back to a central system (619). When devices are reporting consumption information at frequent intervals, this flow of data can be overwhelming to those trying to make sense of it. Furthermore, even having this data does not always aid in the diagnosis or decision-making process in detecting the equipment that may be in need of repair or servicing.

Even when looking at the data for each piece of equipment separately and establishing patterns, the data on its own is missing much of the context that would help to interpret it. Looking at the hourly consumption of thousands of devices without knowing what normal consumption in the current context should be does not allow for much more that the detection of the most severe of anomalies. Benchmarking of equipment when newly installed and knowing the expected consumption patterns of this equipment as it ages is an important factor for being able to determine if equipment is working optimally or not. Benchmarking these across like facilities provides additional context and validation. External environmental factors can also affect how much energy is consumed and, in some cases, problems may be interrelated and thus the facilities controller (618) can correlate and interpret this data from individual devices (613, 621*a*-621*e*) monitors (614) and sensors (610).

Turning now to FIG. 3. we see a block diagram depicting typical remedial actions available for energy usage capture via monitoring. The energy consuming devices (707, 613,

713, 621a, 621b, 621c, 621d, 621e) can be controlled in one or more ways as depicted. In some cases, heavy equipment (613) is connected (612) directly to the electrical panel (701) as in the case of HVAC or Walk-in freezers or refrigerators. These devices (613) are connected (612) to the electrical panel (701) and a panel level meter (705) is deployed. The panel level meter may include line monitors (714a, 714b, 714c, 714d) such as current transformers. Data is collected about the operation of the energy consuming device (613) through the line monitors (714a-714d) and transmitted to the facilities controller (709), which may, in turn, transmit the data to a remote control and monitor computer (619). In other cases, in-line metering through power switches or plugs (614) is provided for equipment such as lights or other plug-in equipment without dedicated circuits. In these cases, the inline metering switches and plugs are connected (713) to the electrical panel (701) and the data collected by the inline metering switch or plug (614) is also communicated to the facilities controller (709). One of skill in the art will recognize that connections may be wired or wireless. In some cases, the facilities controller (709) can also communicate directly with devices and sensors (707, 613, 713, 610, 621a-621e) through an API (708, 617, 714, 715) to both collect and manage or issue commands to these devices. Note that in addition to the device data, other sensors may be deployed (610) which also collect data unrelated to electrical usage and can include temperature, humidity, occupancy among other things. This data is also collected by the facilities controller (709) for decision making purposes.

The facilities controller (709) and/or the remote computer (619) correlate the data received from devices and sensors and make decisions on actions to take. These decisions include control functions on the devices issued remotely, as well as, triggering remedial actions which may involve manual intervention such as dispatching a technician. Additional changes could involve making changes to facility procedures and processes (720). This may be done directly from facility controller (709) or through the central monitoring systems (619) and the procedures are show in this depiction as being in the cloud. For example, an automatic defrost cycle could be rescheduled to a different time.

In one scenario, if a device (613) is determined to have failed, a switch to a backup device (713) may be done if such a device is available such as a backup generator. Depending on the availability of commands supported in the API, other command sequences such as resetting the device, going back to default settings or other such control actions can also be initiated on one or both of the energy consuming devices (613) and the backup device (713) through their respective APIS (617, 714). In other situations, direct power off can be triggered through communications with in-line power switches (614) or panel level switches (705) to power off the devices.

In other configurations, a control device (707) may be used to manage the energy consuming device (613) and commands may be sent to this control device (707) through its own API (708) from either a facilities controller (709) or a remote computer (619) through the cloud. This control device (707) could be a temperature sensor with setpoints and program cycles that can be used to set operating programs for the energy consuming device (613) directly through either the device (613) API (617) or simply by controlling the power (612) to the device. While FIG. 3 shows the device (613) power (612) connected to the Panel (701) through the control device (707), this device (613) can also be connected (612) directly to the panel (701) without such an intermediate connection, as will a control device (707) which is always on.

Additional monitoring sensors/peripheral sensors (610) may be deployed to measure things like temperature, humidity, vibration, opening/closing of doors, or room occupancy. Peripheral sensors can include occupancy sensors, which can take varied forms and essentially track activity detecting and counting occupants in an area. Infrared or break-beam sensors have a transmitter and receiver across a common area, such as a door and they count people as they walk by breaking the beam. Ultrasonic sensors bounce sound waves off people as they walk by detecting changes in the return timing of the bounced sounds. Thermal sensors use body heat and computer vision to identify people whereas density sensors use depth data. Cameras or optical vision sensors determine movement and count people by detecting shapes and movement. Wi-Fi or BLE (Bluetooth low energy) sensors track devices, such as personal phones to count people. In these cases, one can take data about both energy use, and environmental data and business data to make decisions. For example, a device that may be overheating can be temporarily turned off or shut down to let it cool before resuming normal operation.

Control of the devices (707, 613, 713, 610, 621a-621e) may also be done simply to limit peak usage of electricity rather than deal with an immediate or pending device failure or malfunction.

In one example, consider a dryer vent that has come lose from its exhaust outlet that is now exhausting hot air directly into the normally air-conditioned space in which it is operating. While the problem is clearly with the dryer, the performance of the dryer and its energy consumption may remain the same, as ultimately it is venting well and able to perform its function adequately without any need for additional energy. Rather, the air-conditioning unit faced with an inflow of hot air and added humidity must now cycle more frequently in an attempt to cool this air and keep the room at the stable temperature as per the set point adjustment of the temperature sensor. In such a case, a humidity sensor (610) may detect internal humidity and correlate this with additional energy consumption of the HVAC generating remedial actions that can disable the dryer or raise an alarm. In the case that the dryer is gas-powered, a carbon monoxide sensor (610) detects harmful amounts of carbon monoxide, the whole facility may be shut down and evacuated as part of the remedial actions. This can be signaled by a separate alerting device (725).

Equipment types and their consumption vary greatly as does the location and method with which to monitor them. For example, HVAC units, ovens, and hot water heaters are typically on their own dedicated circuits and one would install monitoring (705) at the electrical panel (714a-714d). These are often the largest consumers and are thus excellent candidates for monitoring. Other devices such as lights, or electrical outlets may share a circuit and while they can be monitored in the aggregate at the circuit level at the panel, smart plugs (614) and switches can also be deployed that report energy usage at a more granular level for these types of equipment directly from the plug load or switch. As electrical devices continue to become more intelligent, the electrical device may be able to communicate with the smart outlet or controller to identify itself.

Failure types or fault types are numerous and range from human or operational errors, such as, forgetting to turn off the lights or power down equipment; to accidental damage, such as, a seal that gets damaged on a freezer door, or a coolant line that gets bent. Simple degradation or lack of maintenance can also become problematic such as letting coolant levels get low, the accumulation of dust or grime on coils, or even the blocking of vents or airflow by the stacking of supplies, interference by pests, or introduction of debris. Resolution to such problems may simply be updating facility processes and procedures (720).

In many circumstances, equipment may also compete to control the environment causing unnecessary energy waste. Examples of this can easily be found on shoulder seasons when both heat and air conditioning may be activated at the same time to attempt to keep a room comfortable. The setpoints are often not calibrated or set to be complementary and thus two systems may be competing.

Even when considering two identical facilities with similar business volumes and similar or identical equipment in the same climatic zone, it is possible that human elements come into play. Consider a worker who intentionally leaves a door open, or perhaps one who simply wants to get fresh air or enjoys a breeze without consideration to the energy cost. Or, it could be that another worker decides to operate a space heater. Another may charge their electric car daily while at work. These situations, do not adhere to operational policies (720), are outside of the normal operating parameters.

In another such situation, one worker decides to use the corporate bread ovens to bake goods for personal use. This type of outside activity cannot be derived from the business volume, however, would certainly affect energy consumption. In such cases, triggering an abnormal alarm that there is an undue percentage of baking for the amount of business may narrow down the detection of these anomalies.

If something has happened such as a freezer door getting bent, or condenser coils crushed, or even boxes being put on top of a cooling cage restricting airflow, a change in consumption can be observed almost immediately. It may not be immediately recognized as a problem as an increase in energy consumption could also indicate the addition of "warm" items or restocking of supplies into the freezer. However, over a longer time period this deviation would be recognized as a fault and trigger some action, such as, the dispatch of a technician to determine the cause. The ability to predict or narrow down potential issued through prior machine learning of symptoms, causes and conditions would also allow such a technician to go better prepared potentially being able to resolve the problem in a single trip.

In other cases, a device may suddenly cease operating. In this instance, it is likely that a failure has occurred. It could also be that a manual intervention has occurred to turn the unit off. Typical monitors would only capture current draw and would only report that the device is no longer drawing current. Cameras (730) or microphones can be deployed in conjunction with monitors to give a visual or audible indication, enhancements in audio and video recognition and robotic process automation may also allow for automated actions to be generated from these feeds. In other cases, devices can provide diagnostic or error codes directly through APIs (714, 617, 708, 715) or when powered off or non-responsive, the lack of connection capability also signals an alarm that the device has failed.

Occasionally, conditions may be related, and the system can combine multiple data points. For example, if the temperature in a freezer is rising fast when the compressor turns off, it is most likely due to a leak. However, if the temperature stays consistent when the compressor turns off, it could be that the compressor itself is failing. Additional sensors (610) can be added to capture more data such as door open, frost buildup, coil or coolant temperature, or outside temperature and humidity.

The system can be automated to detect and diagnose system faults and take the appropriate corrective action. This may in some cases be simply contacting someone to let them know a door is suspected of having been left open, but in other cases a system fault requiring parts may trigger a dispatch request or even the ordering of parts if spares are not kept. In other cases, to preserve the system and avoid catastrophic failure the system may take automated action such as turning off or adjusting the operating parameters where interfaces to do so exist. For example, a freezer that has a coolant leak may burn out the compressor should it continue to run before service can be had. In these cases, turning off the compressor may be the best option generating the appropriate alerting (725) for operators to take notice. In another case, such as the case of the hot water heater with the leaking pressure release valve, turning off the element, at least during off hours, could save substantial energy until such time that these can be replaced. In other situations, a device may have overheated, and may only have to be turned off for a short time. In some cases, separate sensors (610) may be deployed to monitor operating conditions that are not available from energy consumption data or device APIs alone.

Other examples are not as straight forward, and the system employs predictive analytics based on historical data to diagnose conditions with a degree of confidence. For example, if one has many months of data and has experienced multiple failures of a given type, looking back over the data to correlate readings that led up to the failures are used to predict the same failure happening with other units. Predictive analytics can provide such predictions with a degree of confidence that typically increases as the data set grows. For example, if nine times out of ten we've seen a compressor failure within a month after a certain cycling pattern has been detected, we can say with 90% probability that a potential failure is imminent and provide appropriate alerting (725). Machine learning from programmed models is also employed for known scenarios.

The real time detection of failures allows for 'fixing' or 'reacting' to events relatively quickly and to avoid unnecessary energy consumption. Practical actions can be taken with a real impact to both preserving the life of equipment, reacting quickly to keep businesses operational, and eliminate wasted energy due to failed and degraded equipment.

A remote-control action such as changing a set point on a device, resetting a device, adjusting a device, dimming the lights to minimize peak energy use, among other things are undertaken by the system.

The dispatch of a technician or creation of a work order or the sending of an alert via email that triggers an action is done by the system to react to and alert (725) based on real world problems.

In summary, the system is able to find a problem, drill down and determine the root cause of the problem, often as a result of analytics and machine learning from past data, and then automatically and remotely institute a change via remote control.

Turning now to FIG. 4. we see a typical dashboard view of information from a central monitoring site of the system depicting multiple sites being monitored. There is a geographic view (801) showing points representing the individual facilities depicted in their geographic locations. A set of filters and search criteria (802) are presented on top to allow for narrowing down of the results depicted in the geographic view (801). Further aggregate statistics about electricity use and other selectable parameters are shown in highlighted boxes (803) in this dashboard view. Underperforming facilities can be shown in highlighted colors allowing users to focus on these facilities to see more detailed statistics.

Turning now to FIG. 5 a statistical view of savings over time is provided. The x-axis (401) shows time periods with total savings shown in a bar chart format (402). Selectors and filters are shown in a header (403) allowing for the selection and searching of individual facilities or groups of facilities by various options. Further, selections of actual or expected savings can be selected (404). If facilities are not achieving the expected energy reduction, one can drill down to see the underperforming devices and take remedial actions. The bar chart-based comparisons (402) can be used to show facilities, groups of devices or individual devices, circuits, or submetering values. They can be used to show energy use (404) or can also be used to show other data derived from sensors such as humidity, vibration, occupancy etc.

When considering expected savings, the system determines trends and estimates based on historical benchmarks. For example, in a QSR (Quick Server Restaurant) after having changed to LED lighting in hundreds of locations, it is seen that this change should achieve a decrease in energy use of 8% on average.

An interquartile range method is used to filter out outliers or extreme values, and thus values are extrapolated using the median as opposed to the mean. The interquartile range is used to run the analysis and predict the outcomes. This is achieved by splitting the data set it two, determining the middle of both halves, and then using the data set from the middle of the lower ½ to the middle of the upper ½. To illustrate, assume a grouping of the numbers 1 through 10. We would split the number set in ½ obtaining two sets where the first set is the group 1-5, and the second set is the group 6-10. The middle of the first set, 1-5, would be 3 and the middle of the second set, 6-10, would be 8. Now, to run the analysis, we would run the number set from 3-8 to obtain our estimate. In this case, the estimate is 5 and using either the whole data set or the interquartile range gives the same results. In typical examples, the outliers would be exceptions, perhaps odd-ball installations or errors which could skew the typical result. In a data set where most numbers range between 4-6, but we have the odd 10 or 0, it is best to strip out these extremes and use the interquartile range method.

In determining expected savings there may also be some expected variance. For example, seasonal variations compensating for temperature changes and business conditions may have a major impact. For this reason, a rolling 12- or 24-month group of values is used to be able to compare and analyze the dataset from year-to-year accounting for seasonality by comparing year to year data from the same month.

Another driver may be business or operational considerations. For example, external factors such as being next to a university campus which lets out for summer. In this case, the seasonality method of comparing year to year same month results will account for changes from these predictable school breaks and resumptions.

Take however the construction of a new neighborhood development, a new residential or commercial building, or even the addition of public transportation. Each of these may have a positive or negative impact on a business driving more or less energy use due to changes in business activity. These types of factors can skew the year-to-year results, but when looking at energy use as a percentage and by using a compensation factor to skew results based on business activity into the equation the model compensates for these variations.

While lighting may take up 8% in the typical QSR, the lighting energy cost is consistent with the opening time and the daylight hours of the business regardless of how many patrons frequent the establishment or facility. However, when looking at other energy consumption, such as bread baking ovens for example, we may see that the volume of baking grows linearly with an uptick in business. Of course, there is some variance depending on what the patrons order, but if the typical bread baking oven takes 2% of the energy use for an average operation, one with twice the volume of bread baking may see this percentage grow to 4%. In addition to bread baking, the QSR with twice the volume will also make more ice, will need to chill more drinks. There will also likely be more door openings for the refrigeration units as trays are extracted, and more hot water is needed to clean the trays. Further, with twice as many people coming in and out the door opens more frequently letting in outside air, and the addition of bodies into the space also affects the HVAC operation requiring additional cooling or heating cycles depending on the season. All these factors will drive some percentages lower and others higher.

As such, a business-related skew is added to the calculations to drive the interquartile range method in the appropriate direction based on business type and volume with information known about a business's operation. By adding information about the business volume, the forecasting and modeling for that same business also becomes more accurate. By comparing similar businesses with different business volumes, one can also ascertain how the volume affects the energy use of the various elements used in the business.

Unexpected events can also take place such as changes in regulations, power outages, curfews, natural disasters, and the like. In these cases, it is natural that the energy usage for a particular facility will be affected and may be affected drastically. Take for example a situation wherein a pandemic has forced the closure of a business or halted the ability for patrons to dine indoors. Such an event drastically reduces the business volume and drastically reduces the energy use. If the business remains operational, for delivery or for takeout orders, it is likely that some level of activity of the various energy consuming devices will still have to take place. Taking again the QSR Sandwich shop example, assume that the bread oven must run at a minimum once per day if it is doing any business at all to ensure that the bread being served is fresh. We can measure a growing business in multiples of bread oven bake cycles. If the shop closes completely, the bake cycles will fall to zero. In this latter case, even the lights will be turned off and thus energy consumption is at a bare minimum maintaining some level of refrigeration and HVAC for the space alone.

Similar increments for other pieces of equipment can be established based on business volumes. These can include icemakers, drink chillers, heating elements and the like. While some equipment, lights, HVAC, and refrigeration are less variable, there is still some impact to cooling as more people come in the room and the door opens more often.

Turning now to FIG. 6. A holistic machine learning approach is depicted at the facilities level. The system looks for anomalies at the equipment level (900) by comparing usage curves to individual performance data (901) comparing this with baseline data (920) previously established for the same facility, similar facilities, and similar equipment.

The baseline data (920) is also improved and enhanced as more data is gathered by the system (912).

This individual performance data (901) is made up of usage curves that the device will typically exhibit. The system now takes environmental data (903), which may be available from external feeds and information sources, or data captured by peripheral sensors deployed as part of the monitoring system. This Environmental data (903) is overlayed (902) with the individual equipment performance data (901) and combined in a way as to compensate for the effect that the environmental data may have on these patterns.

This newly combined model is again adjusted by taking building related data (905), which may be available from predefined measurements and relatively fixed information such as building materials, exposed walls, window areas and room sizes and combined (904) to come up with a further adjusted model.

Data about business performance (907) is further added (906) to the model and includes information from sensors such as occupancy, door openings, and cooking cycles, but may also contain traditional business data brought about by integration with external accounting systems showing actual sales and inventory turns.

The system uses machine learning (908) to adjust the individual device models (901) and combine these into a normalized site model (909) that removed the compensation factor and thus the effects of the external factors and interactions of devices amongst each other. This provides a normalized set of measurement data that can be used to compare device operation across sites regardless of this outside influence. The system also creates a location-tuned set of site performance data (913) which is used to estimate and baseline the site performance using the same equipment. This set of data (913) factors in the external factors and interactions to detect any anomalies that may be outside of normal operation. For example, when business increases and foot traffic increases (visible through occupancy sensors and movement), the model dynamically compensates for more refrigerator door openings, more cooking, and more HVAC requirements. When the lunch time rush subsides, foot traffic reduces, and the system again compensates for this setting different expectations for energy use with the lowered activity/demand. These cycles may be at varying intervals and may be short term such as daily or weekly cycles but may also be longer term such as schools being out for summer, roads being closed, or even new construction driving more or less business to an area.

When anomalies occur, manual intervention (910) may be initiated which may provide further feedback (in addition to the feedback we see from performance curves (901), which can be entered (911) to further fine-tune and adjust (912) the models. Diagnostics and further tests (913) are also triggered by the system to give additional feedback (911), which again is used to make adjustments (912) to the baseline (920), and each of the models (913, 909, 901) as appropriate.

It is still further understood that certain equipment may have heavier usage at certain times of the day. For example, the business could be baking bread and the ovens could be drawing a relatively large amount of power at certain times of the day. However, at other times the usage may be much lighter. It is conceived that the system can learn the usage over time and generate usage patterns based on the business patterns.

In addition to individual equipment patterns, the overall pattern of energy usage for the facility is also mapped. Unlike the individual devices where one can clearly see an On and Off cycle and consumption pattern, the timing between all the equipment operating at a site is not uniform and will necessarily have some variance to it. For this reason, pattern matching is not made at the device level, but rather the device usage patterns are extrapolated from the overall usage through submetering. An aggregate usage is derived from these individual readings along with the reading of the main, or total, energy use.

While understanding the pattern deviations and establishing causes with some probability is one aspect of the invention, another aspect is the ability to automatically correlate the various sensors to better predict and then take automated actions. The establishment of this root cause table and confidence level and the ability of the system to learn and adjust/expand this table are key elements. As the predictions are proven true, confidence in the determination algorithms increases while when proven wrong, adjustments are made, and algorithms adjusted.

Turning now to FIG. 7. We see an example energy usage curve for a piece of equipment and illustrated compensation table for business and environmental factors.

The usage curve (1001) shows the energy usage over time. Normal cycles (1002, 1004) are depicted as well as an abnormal lunch time rush (1003) cycle. This is just one example of a curve where external factors should be compensated for in the estimation of energy usage. Once again, cycles may span short periods such as minutes or hours but may also be longer term such as weekly, monthly or yearly for example.

In the first normal cycle (1002), note that the energy usage is flat (1005) when the compressor is not in use. When the compressor turns on, there is a spike (1006) in usage, followed again by a flatness (1007) when usage stops. The compressor turning on uses energy and this is shown by the area under the curve between (1005, 1006, 1007) depicting the energy use while the compressor is functioning.

When looking at the lunch time rush cycle (1003) the compressor turning on (1009) and turning off (1010) can also be seen. In this instance, the time the compressor is off (1008, 1010) is shorter in duration than the time the compressor is off during the normal cycle (1005, 1007). Also, the time the compressor is on (1009) during the lunch time rush cycle is longer than the time the compressor is on during the normal cycle (1006).

Looking below the curve (1001) a table (1020) of compensation factors is depicted. First, the column depicting normal cycle durations (1021) shows the expected and duration for events such as compressor on and off in minutes. Column (1026) shows the expected duration during the lunch time rush cycle based on business and environmental factors. The table shows sample values and logic for how to compensate for external factors, in this case a door sensor. The values read by the external door sensor are shown (1022) and are in this case 10 per minute. The compensation factor (1023) shows the logic employed. In this case, when the door opens less than 3 times per minute no adjustment is made, but if it opens 5-9 times a minute a factor of 1 is used, whereas greater than 9 times a factor of 4 is used for the compressor off time. Similarly, for compressor off time, the example used shows a factor of 0, 1 and 2 for the above logic in the table.

A separate set of sensor readings for temperature and humidity feed data into the table (1024) and these are fed into a calculation (1025), which also impacts the compressor on/off times. In this example, the difference in temperature between the expected delta room value causes a change to both the compressor on/off times by this delta temperature/2

Using the values and formulas depicted (1021, 1022, 1023, 1024, 1025) it can be seen that for the compressor off time, which is 10 minutes in the normal operation (1022), adjust this by −4 (1023) because the door sensor readings (1022) are >9. This leads to a compressor on value of 6. Take the temperature sensor reading (1024) and the formula (1025) and see that an additional 2-degree variance is present, which should be adjusted by minus 2/2 or 1 degree. This results in an overall compensated temperature reading adjustment resulting in a predicted compressor off time of 5 minutes.

Similarly, for compressor on time, using the values and formulas depicted (1021, 1022,1023,1024,1025) and the normal on time, which is 10 minutes (1022), adjust this by +2 (1023) because the door sensor readings (1022) are >9. Adding the formula (1025) compensation for the 2-degree variance, adjust by a further plus 1 degree resulting in a predicted compressor on time of 13 minutes total after adjustments.

These new values are the baseline for compensated and expected operation during the peak rush hour lunch time. If the compressor readings are out of this range with a given amount of threshold, problems can be accurately predicted. These values are monitored and machine learning is applied to tune the model as shown previously in FIG. 6.

To further highlight the cyclic nature of energy consumption patterns for installed systems, consider the example of a deep freezer used in a restaurant environment. The freezer may be set for a set point of −20 F degrees. When the internal temperature rises to −18, the compressor activates and starts to cool the freezer until the −20 degree set point is achieved after which the compressor shuts off. This cycle of cooling and warming creates a pattern that will repeat consistently with the duration of each interval being substantially identical within reasonable tolerances. These cycles can be seen and measured with the electrical power or current drawn by the compressor of the unit such that one would expect to see a spike in power consumption as the equipment turns on, and a settling into a normalized utilization level over a period of time the compressor remains on to cool the freezer by the required two degrees. Following this, it would be expected to see a drop in power utilization when the temperature set point is reached and the compressor cycles off. It would be expected that the equipment would remain off until the freezer gradually warmed up to the preset −18 degrees, at that point the cycle would repeat. Each of the cycles in the above example, which can also be seen in FIG. 7, exhibits a consistent pattern. It is contemplated that these patterns could be monitored and acted upon to trigger automated actions if there is a noticeable change or deviation from the expected pattern.

In a normal operating environment, additional variables come into play that will impact the cycle described above. These variables could include, opening the door of the freezer (the longer the duration and larger the impact), introduction of warm items into the freezer (the greater the number of items the larger the impact) and external temperature variances (the larger the variance the larger the impact). Other normal periodic operational functions could also impact these expected cycles such as defrost cycles. While these factors may vary an expected pattern, they can be detected and factored into the monitoring system because, in most cases, these are only temporary deviations. For example, warm items eventually cool down, the air entering the freezer while the door is open eventually drops in temperature, and the room HVAC typically brings the room to a stable operating temperature. In contrast, variances caused by equipment faults or malfunctions that require intervention will persist as prolonged variances over many cycles.

These cyclical patterns may be understood and characterized at a device level, but when it comes to a complete facility, the interrelationships and interdependencies are beyond the scope of these systems. The ability to 1) correlate a large number of independent variables; 2) to match these to known patterns at a holistic level; and 3) to single out anomalies is a key feature needed to truly optimize energy savings for a facility or group of facilities.

The timing of measurements is also noted because it is important to diagnose and monitor when dealing with the equipment at hand. For example, an oven in one bakery may consume twice as much energy as one in an equivalent bakery simply because one bakes twice as many baked goods. Measuring over a day period or over a time period gives some indication but measuring the cycle of heating from room temperature to a given temperature say 350 F degrees and keeping an oven at a steady 350 F degrees may provide more information about potential equipment issues. If one ever requires additional cycles to maintain a constant temperature, it may be indicative of a leak or a problem in an element being able to heat efficiently. Similarly, for a freezer, a cooling cycle which is repeated more frequently may indicate a problem with the unit being able to maintain a temperature and could indicate a potential problem with a seal. A longer on cycle time may indicate problems with the coil or compressor.

In considering a typical energy efficiency initiative it can be beneficial to look at all aspects of the cycle from an initial analysis, through the installation of upgrades and to the eventual monitoring and maintenance of the system. Initially, an energy audit would be performed where the existing facility would be analyzed and faulty, sub-par or aging equipment recognized, and a plan made to upgrade these to set a baseline for the facility. There are a host of different repair and upgrades that can be installed in a facility from lighting, to HVAC to pumping and kitchen equipment and the like, all of which can be adjusted for optimal efficiency.

When deploying new equipment, it should be noted that base line measurements regarding such systems should be known and are essential as they indicate what should be considered normal operating limits and thresholds for the equipment. These limits can be programmed to avoid false alarms but also provide early indication of potential problems and ensuring that a new piece of equipment performs to the expected norms, something that is otherwise difficult to ascertain without such baseline data Some thresholds for variability must be set to account for seasonal and environmental variances due to temperature, peak operating hours and other external variables that may affect the energy consumption of these devices.

Take for example a typical bakery running their ovens in the morning to bake breads before customers arrive. If business is good, additional baking cycles may be added or subtracted depending on the amount of expected business. On any given day, the baker may decide to run additional baking cycles to add bread throughout the day. These relationships can become complex and the granularity of measurement must be enough to account for such variables to make any determination about functioning of the oven at hand. In the example above, knowing the overall energy use of an oven and comparing it over fixed periods like a day may not adequately account for increases in business. However, with enough data one could set a relatively stable energy consumption measurement benchmark to compare the oven's performance.

Some equipment degrades with time and becomes less efficient consuming more energy. The rate of degradation is variable and will depend on manufacturer, the components used in the equipment at hand, the maintenance performed on the equipment and how often the equipment is used.

The examples listed above are but a sample of scenarios that become part of the determination a prediction of expected energy reduction that can be obtained using upgraded equipment or additional sensors and devices that help to dynamically regulate or control device operation.

Turning now to FIG. 8 a system is provided that can adjust facility operating procedures based on energy management functions. Existing processes (1103) are documented and known to the system in a way that certain functions should take place at certain frequencies based on business activities. The system then monitors (1100) the energy consumption and the operations through sensors and see how devices are turned on or off (1105) as the business is run. If these activities do not align with the established processes (1107) manual intervention and recording of events is done and changes to processes (1110) are made where appropriate. Even when processes are followed, the system looks for optimization to billing models (1106) to improve processes where possible. Frequently occurring faults may also be flagged for procedure improvements to avoid them in future. Such faults could be simply human errors of forgetting to turn off the lights when leaving at night, or a temperature controller failing to change to a night setting.

The following are some parameters that would be advantageous to monitor. These could provide data to adjust the expected power usage pattern or signature, or they could be independent measurements that could be independently monitored to lower operating and maintenance costs. These parameters are only provided to be illustrative to allow for a better understanding of some types of data that would be advantageous to gather for processing by the system and are not intended to be limiting.

Occupancy sensing. Impact: Impacts temperature in the room and can be an indicator of business volume. Action Taken: adjust expected energy usage curves of equipment that is variable or impacted by volume. While this is appropriate for businesses that deal with consumers, other businesses may also monitor movement of boxes (for shipping for example), items on a conveyor belt or assembly line (for production).

Outside Temperature: Impact: Impacts equipment that must heat or cool to set temperatures by affecting the variation in temperature that must be overcome. Action Taken: adjust expected energy usage curves of equipment that involve heating or cooling to fixed temperatures.

Window and Door opening/closing: Impact: Impacts equipment that must heat or cool or dehumidify. Outside door opening can also be indication of foot traffic and thus business volume. Action Taken: adjust expected energy usage curves of equipment that involve heating or cooling to fixed temperatures and correlate openings with business volume. Abnormal events (door continuously open) may generate alerts.

Preparation of Products: Impact: Depending on the type of equipment, may Impact room temperature, i.e. ovens will increase room temperature. Increases/decreases in production are indicators of business volume. Action Taken: adjust expected energy usage curves of equipment that involve heating. Abnormal events (oven continuously on or exceeding calculated business volume expectations) may generate alerts.

Hot water generation: Impact: Increased energy usage to heat water. Indicator of business volume. Action Taken: adjust expected energy usage curves of equipment that are adjusted with business volume. Excessive use which does not match other business indicators may generate alerts (such as leaky pressure release valve, or running faucet)

It should be noted that peripheral sensors can initially measure all these data points to generate expected baselines for those measurements. While the invention is susceptible to various modifications, and alternative forms, specific examples thereof have been shown in the drawings and are herein described in detail. Is should be understood however that the invention is not to be limited to the particular forms or methods or embodiments disclosed.

What is claimed is:

1. A system for automatically learning and adapting to the energy usage of an equipment operating according to a control input, the system comprising:
   a computer having a storage and coupled to a network;
   an energy consumption sensor and at least one peripheral sensor each associated with the equipment and coupled to said computer;
   software executing on said computer including a baseline energy usage signature for the equipment;
   said energy consumption sensor measuring energy consumption of the equipment during a first measurement period and generating first energy consumption data;
   said at least one peripheral sensor measuring a parameter during the first measurement period and generating first peripheral measurement data;
   said software modifying the baseline energy usage signature based on the first energy consumption data and the first peripheral measurement data to generate a modified baseline energy usage signature;
   said energy consumption sensor measuring an energy usage of the equipment during operation of the equipment and generating energy usage data;
   said software comparing the energy usage data to the modified baseline energy usage signature to determine if a threshold deviation has been reached, the threshold including both magnitude and timing characteristics; and
   wherein when the energy usage data exceeds the threshold deviation, said software initiates an action associated with the equipment selected from the group consisting of: running the equipment through a diagnostic routine, setting the equipment to a preset level of operation, setting the equipment to a preset duration of operation, turning the equipment off, cycling the equipment, generating an alarm and combinations thereof.

2. The system according to claim 1, wherein
   said energy consumption sensor measuring energy consumption of the equipment during a second measurement period and generating second energy consumption data, where the second period of time is different than the first period of time;
   said at least one peripheral sensor measuring a parameter during the second measurement period and generating second peripheral measurement data;
   said software modifying the modified baseline energy usage signature based on the second energy consumption data and the second peripheral measurement data to generate a second modified baseline energy usage signature;

said energy consumption sensor measuring an energy usage of the equipment during operation of the equipment and generating second energy usage data;

said software comparing the energy usage data to the second modified baseline energy usage signature to determine if a threshold deviation has been reached, the threshold including both magnitude and timing characteristics; and wherein when the second energy usage data exceeds the threshold deviation, said software initiates an action selected from the group consisting of: running the equipment through a diagnostic routine, setting the equipment to a preset level of operation, setting the equipment to a preset duration of operation, turning the equipment off, cycling the equipment, generating an alarm and combinations thereof.

3. The system according to claim 1, wherein said at least one peripheral sensor further comprises a plurality of sensors where each of the plurality of sensors generates peripheral data during the first time period.

4. The system according to claim 3, wherein the plurality of sensors are selected from the group consisting of: a contact sensor, an occupancy sensor, a temperature sensor, a humidity sensor, a flow sensor and combinations thereof.

5. The system according to claim 1, wherein the first measurement period is selected to encompass multiple repeating cycles of operation for the equipment.

6. The system according to claim 1, wherein said energy consumption sensor comprises a current sensor.

7. The system according to claim 1, wherein the baseline energy usage signature is based on criteria selected from the group consisting of: a time of day, a date, a geographic location where the equipment is installed, an energy efficiency rating of a building in which the equipment is installed, historical usage data for the equipment, and combinations thereof.

8. The system according to claim 1, wherein said software comprises a filter such that the alarm with not be generated until the deviation from the threshold occurs for a minimum number of equipment cycles.

9. The system according to claim 8, wherein the minimum number of cycles is programmable.

10. The system according to claim 1, wherein the baseline energy usage signature is reflective of cycling of the equipment including: a frequency of the cycling of the equipment, a duration of each cycle, a magnitude of energy usage during each cycle, and combinations thereof.

11. The system according to claim 1, wherein the alarm is generated when the energy usage data indicates: a higher than expected energy usage that exceeds the deviation threshold, a lower than expected energy usage that exceeds the deviation threshold, and combinations thereof.

12. The system according to claim 1, wherein said software modifies the baseline energy usage signature with an operation data set that comprises data corresponding to an expected degradation of the equipment over time.

13. The system according to claim 12, wherein the operation data set is derived from a corresponding equipment operating in at least one other facility and saved on said storage.

14. The system according to claim 1, wherein the equipment comprises a first equipment, the system further comprising a second equipment having:

a second energy consumption sensor and second peripheral sensor each associated with the second equipment and coupled to said computer;

software executing on said computer including a second baseline energy usage signature for the second equipment;

said second energy consumption sensor measuring energy consumption of the second equipment during a third measurement period and generating third period energy consumption data;

said second peripheral sensor measuring a parameter during the third measurement period and generating third period peripheral measurement data;

said software modifying the second baseline energy usage signature based on the third period energy consumption data and the third period peripheral measurement data to generate a second modified baseline energy usage signature;

said second energy consumption sensor measuring an energy usage of the equipment during operation of the second equipment and generating second energy usage data;

said software comparing the second energy usage data to the second modified baseline energy usage signature to determine if a threshold deviation has been reached, the threshold including both magnitude and timing characteristics; and wherein when the second energy usage data exceeds the threshold deviation, said software initiates an action associated with the second equipment selected from the group consisting of: running the second equipment through a diagnostic routine, setting the second equipment to a preset level of operation, setting the second equipment to a preset duration of operation, turning the second equipment off, cycling the second equipment, generating an alarm and combinations thereof.

15. The system according to claim 13, wherein the action associated with the second equipment further includes: setting the second equipment to a preset level of operation, setting the second equipment to a preset duration of operation, turning the second equipment off, cycling the second equipment and combinations thereof.

16. The system according to claim 15, wherein the first equipment is located at a first facility and the second equipment is located at a second facility.

17. A method for automatically learning and adapting to the energy usage of an equipment operating according to a control input with a computer having a storage and having software executing thereon and coupled to a network, the method comprising the software performing the steps of:

measuring energy consumption of the equipment during a first measurement period with an energy consumption sensor and generating first energy consumption data;

transmitting the first energy consumption data to the computer;

measuring a parameter during the first measurement period with a peripheral sensor and generating first peripheral measurement data;

transmitting the first peripheral measurement data to the computer;

modifying a baseline energy usage signature for the equipment based on the first energy consumption data and the first peripheral measurement data to generate a modified baseline energy usage signature;

measuring an energy usage of the equipment during operation with the energy consumption sensor and generating energy usage data;

comparing the energy usage data to the modified baseline energy usage signature to determine if a threshold deviation has been reached, the threshold including both magnitude and timing characteristics; and wherein when the energy usage data exceeds the threshold deviation, the software initiates an action associated with the equipment selected from the group consisting of: running the equipment through a diagnostic routine, setting the equipment to a preset level of operation, setting the equipment to a preset duration of operation, turning the equipment off, cycling the equipment, generating an alarm and combinations thereof.

18. The method according to claim 17, further comprising the software performing the steps of:

measuring energy consumption of the equipment during a second measurement period with the energy consumption sensor and generating second energy consumption data, where the second period of time is different than the first period of time;

transmitting the second energy consumption data to the computer;

measuring a parameter during the second measurement period with the peripheral sensor and generating second peripheral measurement data;

transmitting the second peripheral measurement data to the computer;

modifying the modified baseline energy usage signature for the equipment based the second energy consumption data and the second peripheral measurement data to generate a second modified baseline energy usage signature;

measuring an energy usage of the equipment during operation with the energy consumption sensor and generating second energy usage data;

comparing the second energy usage data to the second modified baseline energy usage signature to determine if a threshold deviation has been reached, the threshold including both magnitude and timing characteristics; and wherein when the second energy usage data exceeds the threshold deviation, the software initiates an action associated with the equipment selected from the group consisting of: running the equipment through a diagnostic routine, setting the equipment to a preset level of operation, setting the equipment to a preset duration of operation, turning the equipment off, cycling the equipment, generating an alarm and combinations thereof.

19. The method according to claim 17, wherein said software comprises a filter such that the alarm with not be generated until the deviation from the threshold occurs for a minimum number of equipment cycles.

20. The method according to claim 19, wherein the minimum number of cycles is programmable.

21. The method according to claim 17, wherein the baseline energy usage signature is reflective of cycling of the equipment including: a frequency in the cycling of the equipment, a duration of each cycle, a magnitude of energy usage during each cycle, and combinations thereof.

22. The method according to claim 17, wherein the alarm is generated when the energy usage data indicates: a higher than expected energy usage that exceeds the deviation threshold, a lower than expected energy usage that exceeds the deviation threshold, and combinations thereof.

23. The method according to claim 17, further comprising the step of the software modifying the baseline energy usage signature with an operation data set that comprises data corresponding to an expected degradation of the equipment over time.

24. The method according to claim 23, wherein the operation data set is derived from a corresponding equipment operating in at least one other facility and saved on the storage.

25. The method according to claim 17, wherein the equipment comprises a first equipment and further including a second equipment, the method further comprising the software performing the steps of:

measuring energy consumption of the second equipment during a third measurement period with a second energy consumption sensor and generating second energy consumption data;

transmitting the second energy consumption data to the computer;

measuring a parameter during the third measurement period with a second peripheral sensor and generating second peripheral measurement data;

transmitting the second peripheral measurement data to the computer;

modifying a second baseline energy usage signature for the second equipment based on the second energy consumption data and the second peripheral measurement data to generate a second modified baseline energy usage signature;

measuring an energy usage of the second equipment during operation with the energy consumption sensor and generating second energy usage data;

comparing the second energy usage data to the second modified baseline energy usage signature to determine if a second threshold deviation has been reached, the second threshold including both magnitude and timing characteristics; and wherein when the second energy usage data exceeds the second threshold deviation, the software initiates an action associated with the second equipment selected from the group consisting of: running the second equipment through a diagnostic routine, setting the second equipment to a preset level of operation, setting the second equipment to a preset duration of operation, turning the second equipment off, cycling the second equipment, generating an alarm and combinations thereof.

26. The method according to claim 25, wherein the action associated with the first equipment further includes: setting the second equipment to a preset level of operation, setting the second equipment to a preset duration of operation, turning the second equipment off, cycling the second equipment and combinations thereof.

27. The method according to claim 26, wherein the first equipment is located at a first facility and the second equipment is located at a second facility.

* * * * *